July 22, 1941.　　　　M. JAMES　　　　2,249,833
OPTICAL SYSTEM FOR EXPOSURE METERS
Filed Feb. 26, 1940　　　2 Sheets-Sheet 1
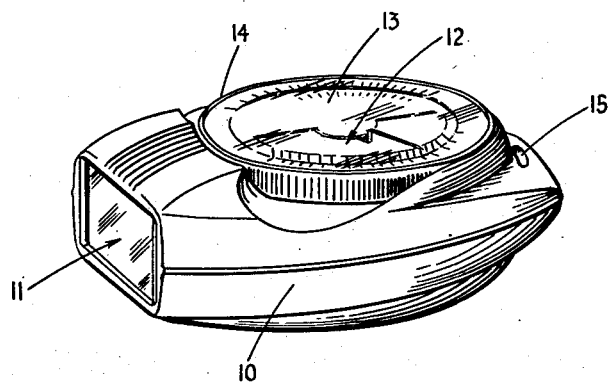
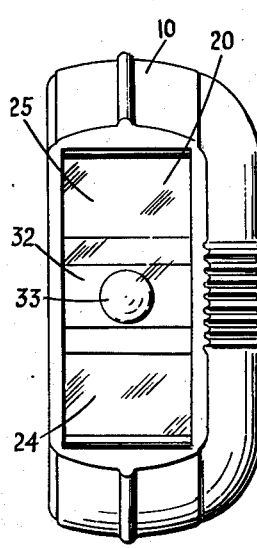 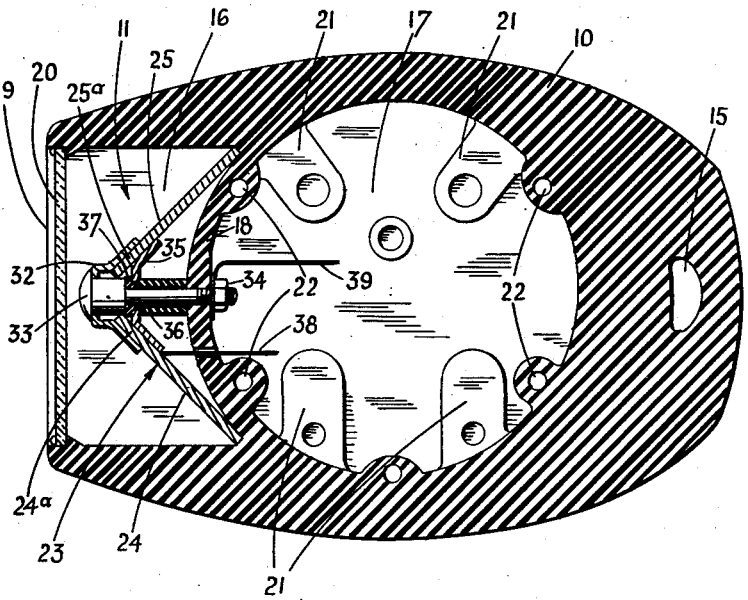
INVENTOR
MAXWELL JAMES
BY James & Franklin
ATTORNEY July 22, 1941.  M. JAMES  2,249,833

OPTICAL SYSTEM FOR EXPOSURE METERS

Filed Feb. 26, 1940  2 Sheets-Sheet 2

INVENTOR
MAXWELL JAMES
BY
ATTORNEY

Patented July 22, 1941

2,249,833

UNITED STATES PATENT OFFICE 2,249,833

OPTICAL SYSTEM FOR EXPOSURE METERS

Maxwell James, New Rochelle, N. Y., assignor to De Jur-Amsco Corporation, Fairfield, Conn., a corporation of New York Application February 26, 1940, Serial No. 320,782

9 Claims. (Cl. 88—23)

This invention relates to a photo-electric cell exposure meter and particularly to an improved photo-electric cell optical system for exposure meters.

In a photo-electric cell exposure meter, it is desirable to limit or restrict the solid angle formed by the light rays striking or reaching the cell to approximately the image or exposure angle of the camera lens. This permits more accurate determination of the brightness of the scene and the exposure factors, since only those rays which will enter the average camera are accepted or permitted to reach or fall on the sensitive surface of the photo-electric cell.

A further desideratum in a photo-electric cell exposure meter is that it should be small in size in order to be conveniently carried and handled by the user. To this end, the photo-electric cell unit and the electrical measuring instrument should be organized and arranged to provide a compact assembly. Preferably, the parts should be so related that the exposure meter may be made of a size which readily nests in the palm of the user.

A further important desideratum is that the exposure meter be as sensitive as possible in order to obtain readings under conditions of low light intensity. Considering that the electrical measuring instrument or meter of an exposure meter be as delicate and sensitive as it is practical to manufacture, the sensitivity of the exposure meter becomes limited by the exposed area of the photo-electric cell. It is, therefore, desirable to increase the area of the photo-electric cell and to utilize the sensitive surface thereof to the optimum value.

It is, therefore, the prime object of my present invention to provide an exposure meter which combines these desiderata, namely, one in which the photo-electric cell unit is so constructed as to permit only those rays which are accepted by the average camera lens to reach or fall upon the photo-electric sensitive surface and in which the effective area of the photo-electric surface may be increased, these results being accomplished without increasing the overall size of the exposure meter. It is thus the object of the invention to arrange the photo-electric cell and the electrical measuring instrument in the exposure meter so as to provide at the same time (1) a control means for restricting the angle of light acceptance, (2) an increased active or effective photo-electric surface, and (3) a compact arrangement or assembly.

To the accomplishment of the foregoing and such other objects as may hereinafter appear, the invention further consists in the structural combinations hereinafter sought to be defined in the claims and described more in detail hereinbelow in connection with the appended drawings, in which:

Figure 1 is a perspective view of an exposure meter of the type to which my invention is applied;

Figure 2 is an enlarged view thereof taken in cross-section and exemplifying the embodiment of the principles of my present invention therein;

Figure 3 is a front elevational view thereof;

Figure 4:
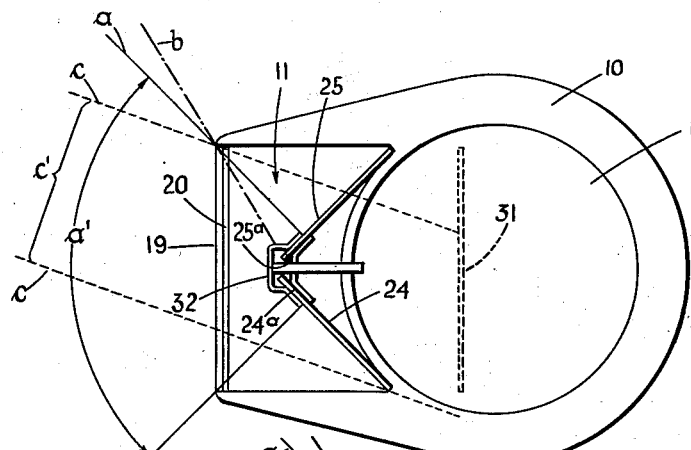
Figure 4 is a diagrammatic view of the structure shown in Figures 1 to 3, showing the optical principles involved.

Referring now more in detail to the drawings and having reference first to Figures 1 to 3 thereof, the exposure meter comprises a casing 10 made of a suitably molded material such, for example, as a phenol condensation product, said casing containing a photo-electric cell unit 11 and an electrical measuring instrument 12. The electrical measuring instrument may be any approved microammeter; and as is well known, this is connected (not shown) to the opposite electrodes of the photo-electric cell to indicate the intensity of the light rays which are incident upon the sensitive surface of the photo-electric cell. The exposure meter illustrated also includes means for translating the light intensity to camera exposure data, and this includes relatively rotatable dials of known type, embodying a stationary dial 13 and a thumb operated rotatable dial 14. The molded casing 10 may also be provided at one end with an aperture 15 for cord suspension. The assembly as shown in Figure 1 is made of a suitably compact size so that it may be readily handled by the user, the size being preferably such that the exposure meter may be cupped in the palm of the operator.

The exposure meter casing 10 is provided with two contiguous chambers 16 and 17, chamber 16 being for the photo-electric cell and chamber 17 for the electrical measuring instrument. These chambers may be separated by the casing wall 18, or, if desired, the separating wall may be eliminated. The photo-electric cell chamber is provided at its front with an opening 19 for admitting light rays to the cell chamber, and this opening is preferably closed by the protective glass window 20. The electrical measuring instrument chamber 17 is provided with means for receiving the meter and dial parts, and these may consist of the integral lugs 21, 21, for receiving the meter attaching screws, and the ears 22, 22, for receiving the attaching elements for the dial parts. It will be noted that the photo-electric cell chamber 16 and the electrical measuring instrument chamber 17 interpenetrate, this being due to the structure and arrangement imparted to the photo-electric cell following the principles of the present invention, with the result that a compact arrangement of the parts is produced.

According to the present invention, the photo-electric cell, generally designated as 23 and which is arranged in the cell chamber 16, is so designed and constructed as to provide means for restricting the light rays that strike the photo-electric cell to an angle corresponding to the exposure angle of a camera. To accomplish this result, the photo-electric cell 23 is made to comprise a pair of cell elements 24 and 25 arranged with their light sensitive surfaces converging from the rear of the chamber 16 toward the front opening 19 thereof, the converging ends 24ª and 25ª terminating a relatively short distance from the said opening 19. With this construction, it will be noted that the space which is subtended by these convergingly arranged cell elements 24 and 25 forms part of the electrical instrument chamber 17, thus enabling these chambers to be brought into closer contiguity to produce the compact assembly referred to.

Figure 5:
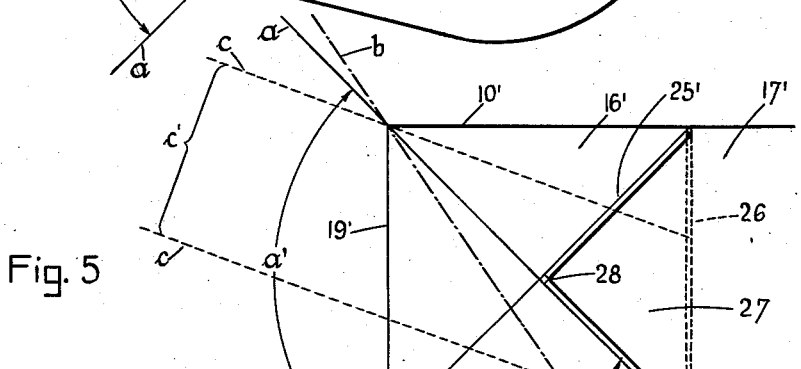
Figure 5 is an optical diagrammatic view of a structural modification.
Figure 6:
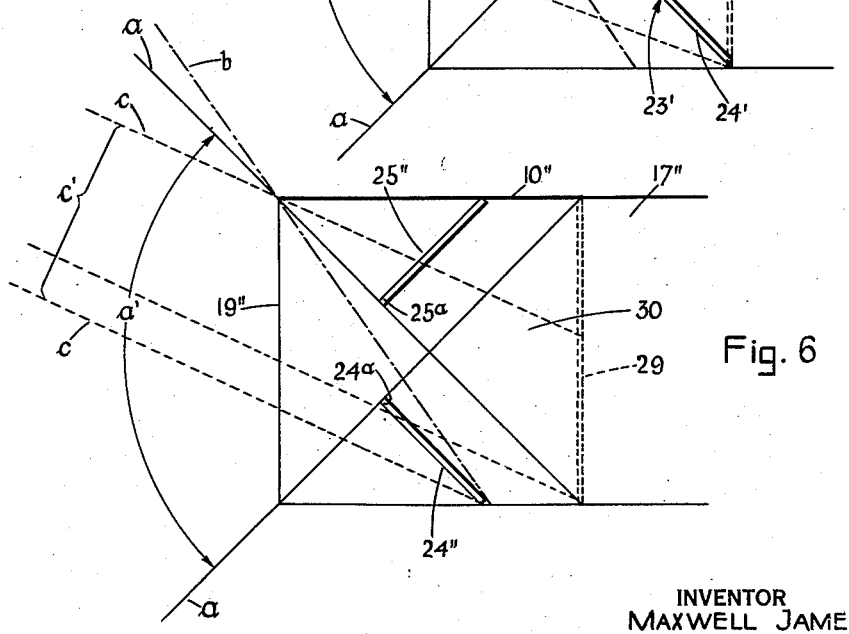
Figure 6 is an optical diagrammatic view of another structural modification.

The principles underlying the invention may best be explained by reference to the diagrammatic views shown in Figures 4 to 6 of the drawings, in which drawings three arrangements are shown, the arrangement of Figure 4 being that embodied in the exposure meter of Figures 1 to 3, and Figures 5 and 6 showing modified arrangements. The optical principles underlying the invention may be best explained by having reference first to Figure 5 of the drawings.

In Figure 5 of the drawings, the diagrammatic parts which correspond to the structural elements of Figures 1 to 3 of the drawings are indicated by similar and single primed reference characters. The angle of light rays that strike the photo-electric cell and which is restricted at an angle corresponding to the exposure angle of a camera, which angle may be briefly referred to as the acceptance angle, is indicated by the full lines $a$, $a$ enclosed by the arrowed line $a'$. A ray of light beyond this acceptance angle is illustrated by the line $b$ and a bundle of rays within this acceptance angle, which is incident upon the photo-electric cell surface, is indicated by the lines $c$, $c$ embraced in the bracket $c'$. Also, for purposes of comparison, at the rear end of the cell chamber 16' is placed in phantom a photo-electric cell 26. The structure may, of course, be designed for any desired acceptance angle, and for purpose of illustration, the acceptance angle for all of the modified forms of the present invention is taken to be 90°.

If a cell chamber such as is shown in Figure 5 is employed with an acceptance angle of 90°, and if it is desired to restrict the light rays that strike the photo-electric cell to an angle corresponding to the exposure or picture angle of a camera, it is known that the photo-electric cell may be placed at the phantom position indicated at 26, this being a distance from the opening 19' equal to the larger dimension or width of the opening. By doing so, only light rays within the acceptance angle $a'$ are incident upon the sensitive surface of the photo-electric cell, and an unwanted ray such as the ray $b$ does not reach the cell, as is clearly shown in Figure 5 of the drawings. Light rays which enter the cell opening at an angle (within the acceptance angle), such as that characterized by the light ray bundle $c'$, will strike or be incident upon only a portion of the photo-electric cell, as is also clearly shown in Figure 5 of the drawings.

With this prior art arrangement, therefore, the full depth of the cell chamber 16 has to be employed and the utilizable area of the photo-electric cell under certain conditions of use is undesirably reduced. Where it is desired to place the photo-electric cell closer to the front opening of the chamber, gratings or grids have to be employed, but this has the disadvantage of obstructing part of the active area of the cell and introducing additional parts which render assembly more difficult.

To provide an equally efficient control means for restricting the angle of light acceptance, while at the same time increasing the active or effective photo-electric cell area and producing a more compact arrangement or assembly, the photo-electric cell, according to the principles of the present invention, is made to comprise the pair of cell elements 24' and 25', and these are arranged with their front or light sensitive surfaces converging from the rear of the chamber toward the front opening, the converging ends terminating a relatively short distance from said opening. With this construction and arrangement illustrated in Figure 5 of the drawings, only the light rays within the acceptance angle $a'$ reach the sensitive cell surfaces, all unwanted rays such as the ray $b$ beyond the acceptance angle do not fall or strike upon the cell surfaces, and an angular bundle of light rays such as $c'$ will fall upon a much larger area of the photo-electric cell than would be the case if the photo-electric cell were located in the phantom position 26. In this Figure 5 form of the invention, the increase of effective cell area due to the use of the cell elements 24' and 25' is about 40 per cent. With these cell elements thus arranged to converge from the rear of the chamber towards the front opening, the space 27 subtended thereby may be utilized as part of the electrical measuring instrument chamber 17', and thus the cell and meter chambers are caused to interpenetrate and produce a compact arrangement.

The cell elements 24' and 25' may be made as separate elements conductively connected together, or, if desired, may be made in one piece. When these elements are manufactured as flat cells, they may be arranged angularly as shown, terminating in the apex 28. If desired, these converging cell elements may be otherwise shaped. For optimum results, when the elements are formed as illustrated in Figure 5 of the drawings, the angle subtended by the cell elements 24' and 25' is made to equal the predetermined angle of acceptance.

Where it is desired to reduce the size still further, the photo-electric cell elements may be brought still closer to the front opening 19 of the chamber, at some sacrifice, however, of the active or effective photo-electric area or surface. This is shown, for example, in the modified arrangements of Figures 6 and 4. In Figure 6 of the drawings, the parts corresponding to the parts shown in Figures 1 to 3 are indicated by similar and double primed reference characters. The optical lines in Figure 6 are indicated by reference characters similar to those in Figure 5. The phantom cell in the structure of Figure 6 is indicated as 29, and the space subtended by the cells 24" and 25" which forms part of the meter chamber 17" is indicated as 30. In this form of the invention, the converging ends 24ᵃ and 25ᵃ of the photo-electric cell elements terminate at the limiting lines a, a of the acceptance angle a'. With this construction, the light rays that strike or reach the photo-electric cell elements 24" and 25" are restricted to the acceptance angle a' in the same way as would be the case if a single cell unit were located in the phantom position 29. However, by means of this arrangement, the enlarged space 30 may be utilized as part of the electrical measuring instrument chamber, enabling a very compact arrangement to be produced. It will also be noted that for some angles, this arrangement permits of a larger effective cell area, and for other angles a slight sacrifice in effective cell area; thus, for a bundle of rays which enter at the angle characterized by the bundle c', there is an increase in the effective area of the elements 24" and 25" as compared with that of an element arranged as at 29.

Reverting now to Figure 4 of the drawings, which optically depicts the exposure meter structure of Figures 1 to 3, it will be seen that the photo-electric cell elements 24 and 25 are arranged substantially in advance of the phantom cell 31, thus permitting a very substantial part of what would otherwise be the cell chamber to be employed for the meter chamber. In the arrangement shown in Figure 4, the apex parts 24ᵃ and 25ᵃ of the photo-electric cell elements may be made to extend within the acceptance angle a', and the unwanted incident rays (such as b) are prevented from reaching these protruding apex parts of the cell elements by having the front electrode contact 32 extend to and cover these apex parts. With this construction, it will be seen that the effective area of the cell elements 24 and 25 when these elements are arranged to converge from the rear of the cell chamber toward the front opening as shown in Figure 4 provides the means for restricting the light rays that strike the photo-electric cell to the acceptance angle, in much the same way as if a single element were used and arranged in the phantom position 31. It will also be noted that with this arrangement, for an angular bundle of rays such as the bundle c', some increase of effective or active cell area is nevertheless produced, even though the cell and meter chambers interpenetrate a very substantial amount, thus enabling a very convenient compacting of the parts.

These described arrangements of the photo-electric cell elements also enable the parts to be assembled in a very simple and sturdy way. Thus, referring to Figure 2 of the drawings, it will be seen that only one means need be provided for holding both photo-electric cells and that the pyramidal form thereof presents a sturdy structural assembly. This arrangement also permits the use of simple low resistance contacts and short leads, thus insuring continuity of the electrical circuits, even though the instrument be submitted to rough handling. In this construction, the contact 32 is held in engagement with the front electrodes of both cell elements by the headed screw 33 and is secured by the adjustment of the nut 34. For making contact to the rear electrodes of the cell elements, there is provided the contact 35 held in position on the screw 33 by the sleeve 36 and insulated therefrom by the bushing 37. Connections of the opposite cell electrodes to the meter may be made by the short leads 38 and 39. It will be seen that all of these parts are readily assembled by this centrally located screw means, and that the adjustment of the nut 34 clamps the cell parts both mechanically and electrically together.

The photo-electric cell exposure meter of the present invention and the optical system therefor will, in the main, be fully apparent from the above-detailed description thereof. It will be seen that in all of the constructional forms of the invention a design and construction of the photo-electric cell unit is provided in which only those rays which are accepted by the camera lens reach or strike the photo-electric sensitive surface, in which an increased active or effective photo-electric surface or area is produced, and in which the contiguous cell and meter chambers are so interrelated as to enable a very compact as well as sturdy construction to be made.

It will also be evident that many changes may be made within the principles defined by the following claims, without departing from the spirit of the invention.

What I claim is:

1. In a photo-electric cell exposure meter, a casing having contiguous chambers, one for the photo-electric cell and the other for the electrical measuring instrument, the first chamber having a front opening for admitting light rays, a photo-electric cell in said first chamber spaced from said opening, said photo-electric cell comprising a pair of cell elements arranged with their light sensitive surfaces converging from the rear of the chamber towards the front opening, the converging ends terminating a relatively short distance from said opening, said arrangement restricting the light rays that strike the photo-electric cell to an angle corresponding to the exposure angle of a camera, the space subtended by the convergingly arranged cell elements forming part of said electrical measuring instrument chamber.

2. In a photo-electric cell exposure meter, a casing having contiguous chambers, one for the photo-electric cell and the other for the electrical measuring instrument, the first chamber having a front opening for admitting light rays, a photo-electric cell in said first chamber spaced from said opening, said photo-electric cell comprising a pair of cell elements arranged at an angle to each other with their light sensitive surfaces converging from the rear of the chamber towards the front opening, the converging ends terminating a relatively short distance from said opening, said arrangement restricting the light rays that strike the photo-electric cell to an angle corresponding to the exposure angle of a camera, the space subtended by the angularly arranged cell elements forming part of said electrical measuring instrument chamber.

3. In a photo-electric cell exposure meter, a casing having contiguous chambers, one for the photo-electric cell and the other for the electrical measuring instrument, the first chamber having a front opening for admitting light rays, a photo-electric cell in said first chamber spaced from said opening, said photo-electric cell comprising a pair of cell elements arranged at an angle to each other with their light sensitive surfaces converging from the rear of the chamber towards the front opening, said arrangement restricting the light rays that strike the photo-electric cell to an angle corresponding to the exposure angle of a camera, the said angle of convergence being substantially equal to the said restricted angle of light rays, the converging ends terminating a relatively short distance from said opening, the space subtended by the angularly arranged cell elements forming part of said electrical measuring instrument chamber.

4. In a photo-electric cell exposure meter, a casing having contiguous chambers, one for the photo-electric cell and the other for the electrical measuring instrument, the first chamber having a front opening for admitting light rays, a photo-electric cell in said first chamber spaced from said opening, said photo-electric cell comprising a pair of cell elements arranged with their light sensitive surfaces converging from the rear of the chamber towards the front opening, said arrangement restricting the light rays that strike the photo-electric cell to an angle corresponding to the exposure angle of a camera, the converging ends terminating a relatively short distance from said opening and substantially at the limiting lines of said angle, the space subtended by the convergingly arranged cell elements forming part of said electrical measuring instrument chamber.

5. In a photo-electric cell exposure meter, a casing having contiguous chambers, one for the photo-electric cell and the other for the electrical measuring instrument, the first chamber having a front opening for admitting light rays, a photo-electric cell in said first chamber spaced from said opening, said photo-electric cell comprising a pair of cell elements arranged with their light sensitive surfaces converging from the rear of the chamber towards the front opening, said arrangement restricting the light rays that strike the photo-electric cell to an angle corresponding to the exposure angle of a camera, the converging ends terminating a relatively short distance from said opening and extending beyond the limiting lines of said angle, the space subtended by the convergingly arranged cell elements forming part of said electrical measuring instrument chamber, and a contact element covering said cell elements at said terminating ends.

6. A photo-electric cell optical system for exposure meters and the like comprising a casing, a chamber in said casing, said chamber having a front opening for admitting light rays, a photo-electric cell in said chamber spaced from said opening, said photo-electric cell comprising a pair of cell elements arranged with their light sensitive surfaces converging from the rear of the chamber towards the front opening, the converging ends terminating a relatively short distance from said opening, said arrangement restricting the light rays that strike the photo-electric cell to an angle corresponding to the exposure angle of a camera.

7. A photo-electric cell optical system for exposure meters and the like comprising a casing, a chamber in said casing, said chamber having a front opening for admitting light rays, a photo-electric cell in said chamber spaced from said opening, said photo-electric cell comprising a pair of cell elements arranged at an angle to each other with their light sensitive surfaces converging from the rear of the chamber towards the front opening, the converging ends terminating a relatively short distance from said opening, said arrangement restricting the light rays that strike the photo-electric cell to an angle corresponding to the exposure angle of a camera.

8. A photo-electric cell optical system for exposure meters and the like comprising a casing, a chamber in said casing, said chamber having a front opening for admitting light rays, a photo-electric cell in said chamber spaced from said opening, said photo-electric cell comprising a pair of cell elements arranged at an angle to each other with their light sensitive surfaces converging from the rear of the chamber towards the front opening, said arrangement restricting the light rays that strike the photo-electric cell to an angle corresponding to the exposure angle of a camera, the said angle of convergence being substantially equal to the said restricted angle of light rays, the converging ends terminating a relatively short distance from said opening.

9. A photo-electric cell optical system for exposure meters and the like comprising a casing, a chamber in said casing, said chamber having a front opening for admitting light rays, a photo-electric cell in said chamber spaced from said opening, said photo-electric cell comprising a pair of cell elements arranged with their light sensitive surfaces converging from the rear of the chamber towards the front opening, said arrangement restricting the light rays that strike the photo-electric cell to an angle corresponding to the exposure angle of a camera, the converging ends terminating a relatively short distance from said opening and substantially at the limiting lines of said angle.

MAXWELL JAMES.